(12) United States Patent
Vitito

(10) Patent No.: US 7,604,291 B2
(45) Date of Patent: Oct. 20, 2009

(54) VEHICLE ENTERTAINMENT SYSTEM INCORPORATED WITHIN THE ARMREST/CONSOLE OF A VEHICLE WITH A SWIVEL MONITOR MOUNTING STRUCTURE

(76) Inventor: Christopher J. Vitito, 514 Longmeadow St., Celebration, FL (US) 34747

(*) Notice: Subject to any disclaimer, the term of this patent is extended or adjusted under 35 U.S.C. 154(b) by 527 days.

(21) Appl. No.: 11/200,114

(22) Filed: Aug. 10, 2005

(65) Prior Publication Data
US 2006/0242671 A1 Oct. 26, 2006

Related U.S. Application Data

(63) Continuation-in-part of application No. 11/173,058, filed on Jul. 5, 2005, and a continuation-in-part of application No. 11/172,937, filed on Jul. 5, 2005.

(60) Provisional application No. 60/672,883, filed on Apr. 20, 2005.

(51) Int. Cl.
*A47C 7/62* (2006.01)

(52) U.S. Cl. ............... 297/188.19; 297/217.3; 297/188.16; 296/37.8

(58) Field of Classification Search ............ 297/217.3, 297/188.14, 188.15, 188.16, 188.19; 296/37.8
See application file for complete search history.

(56) References Cited

U.S. PATENT DOCUMENTS

| | | | |
|---|---|---|---|
| 5,161,766 A | 11/1992 | Arima | |
| 5,177,616 A | 1/1993 | Riday | |
| 5,179,447 A | 1/1993 | Lain | |
| 5,222,780 A | 6/1993 | Reh et al. | |
| 5,316,369 A | 5/1994 | Kanda | |
| 5,338,081 A | 8/1994 | Young et al. | |
| 5,374,104 A | 12/1994 | Moore et al. | |
| 5,398,991 A | 3/1995 | Smith et al. | |
| 5,667,179 A | 9/1997 | Rosen | |
| 5,751,548 A | 5/1998 | Hall et al. | |
| 5,946,055 A | 8/1999 | Rosen | |
| 6,007,036 A | 12/1999 | Rosen | |
| 6,256,837 B1 | 7/2001 | Lan et al. | |
| 6,279,977 B1 | 8/2001 | Chen | |
| 6,409,242 B1 | 6/2002 | Chang | |
| 6,443,574 B1 | 9/2002 | Howell et al. | |
| 6,494,527 B1 | 12/2002 | Bischoff | |
| D469,747 S | 2/2003 | To et al. | |
| 6,633,347 B2 | 10/2003 | Kitazawa | |
| 6,663,155 B1 | 12/2003 | Malone et al. | |
| 6,702,238 B1 | 3/2004 | Wang | |
| 6,719,343 B2 | 4/2004 | Emerling et al. | |
| 6,746,065 B1 | 6/2004 | Chan | |
| 6,758,521 B2 | 7/2004 | Imamura et al. | |
| 6,890,012 B2 | 5/2005 | Maierholzner | |
| 6,899,365 B2 | 5/2005 | Lavelle et al. | |
| D508,900 S | 8/2005 | Kawano et al. | |

(Continued)

FOREIGN PATENT DOCUMENTS

DE 3927749 2/1991

(Continued)

*Primary Examiner*—Anthony D Barfield
(74) *Attorney, Agent, or Firm*—Welsh & Flaxman LLC

(57) ABSTRACT

A vehicle entertainment system includes a video system mounted within an automobile armrest/console, the armrest/console including an upper support surface. The video system includes an integrated housing supporting a video monitor and a video source.

20 Claims, 4 Drawing Sheets

U.S. PATENT DOCUMENTS

| | | |
|---|---|---|
| 6,926,329 B2 | 8/2005 | Neumann et al. |
| 6,945,582 B2 | 9/2005 | Chen |
| 6,997,494 B2 | 2/2006 | Neumann |
| 6,997,508 B2 | 2/2006 | Jaaska, Sr. |
| 7,084,932 B1 | 8/2006 | Mathias et al. |
| 7,176,987 B2 | 2/2007 | Liu |
| 2002/0140632 A1 | 10/2002 | Shah |
| 2003/0042378 A1 | 3/2003 | Imamura et al. |
| 2004/0130616 A1 | 7/2004 | Tseng |
| 2004/0175155 A1 | 9/2004 | Liu |
| 2004/0189797 A1 | 9/2004 | Todd et al. |
| 2004/0237111 A1 | 11/2004 | Iraclianos et al. |
| 2005/0066369 A1 | 3/2005 | Chang |
| 2006/0128303 A1 | 6/2006 | Schedivy |
| 2006/0152026 A1 | 7/2006 | Rist |

FOREIGN PATENT DOCUMENTS

| | | |
|---|---|---|
| JP | 05-131879 | 11/1991 |
| JP | 2002-533258 | 10/2002 |

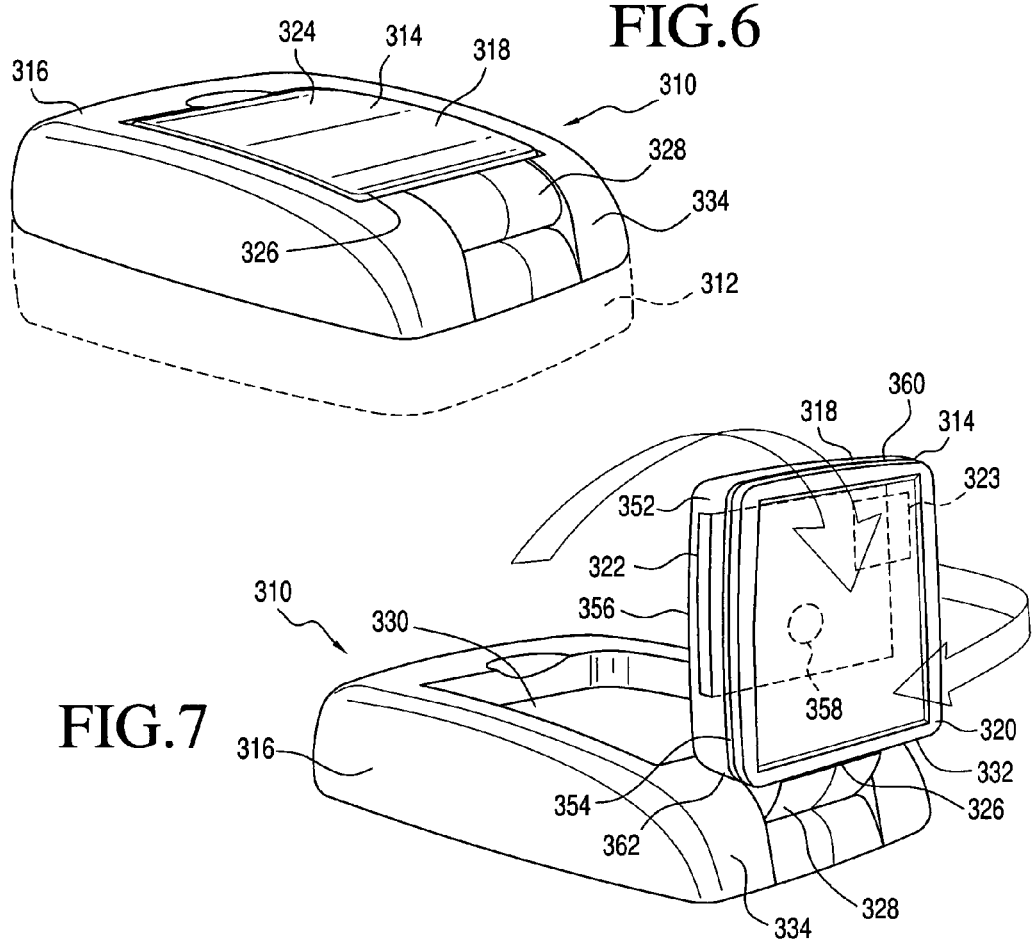
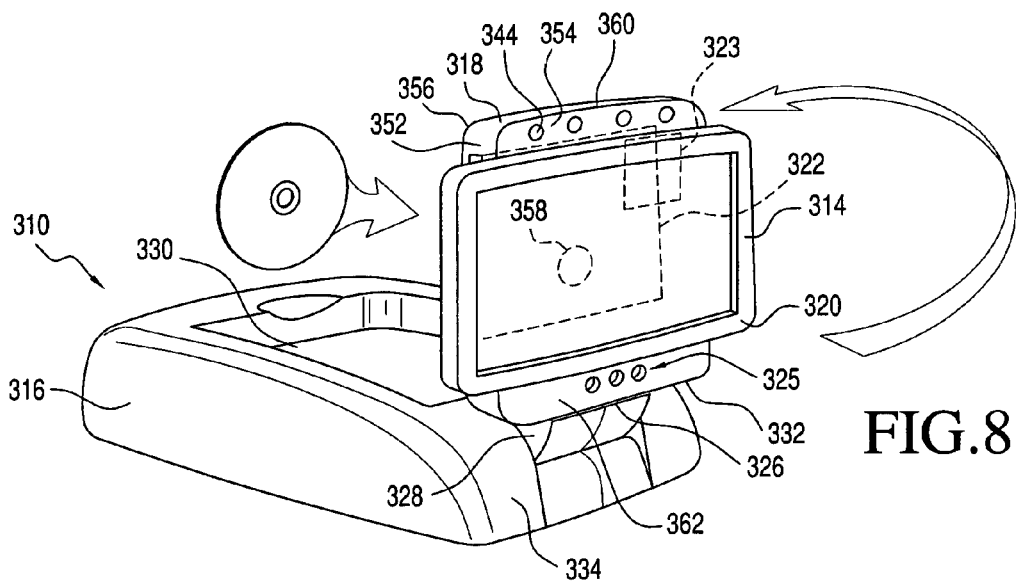

US 7,604,291 B2

VEHICLE ENTERTAINMENT SYSTEM INCORPORATED WITHIN THE ARMREST/CONSOLE OF A VEHICLE WITH A SWIVEL MONITOR MOUNTING STRUCTURE

CROSS REFERENCE TO RELATED APPLICATIONS

This application is a continuation-in-part of U.S. patent application Ser. No. 11/173,058, filed Jul. 5, 2005, entitled "VEHICLE ENTERTAINMENT SYSTEM INCORPORATED WITHIN THE ARMREST/CONSOLE OF A VEHICLE", which is currently pending, and U.S. patent application Ser. No. 11/172,937, filed Jul. 5, 2005, entitled "DETACHABLE VEHICLE ENTERTAINMENT SYSTEM FOR THE ARMREST/CONSOLE OF A VEHICLE", which is currently pending, both of which are based upon U.S. Provisional Application Ser. No. 60/672,883, filed Apr. 20, 2005, entitled "AUTOMOBILE ENTERTAINMENT SYSTEM INCORPORATED WITHIN THE CENTRAL ARMREST/CONSOLE OF AN AUTOMOBILE".

BACKGROUND OF THE INVENTION

1. Field of the Invention

The invention relates to a vehicle entertainment system. More particularly, the invention relates to an entertainment system integrating a video source and video monitor within the central armrest/console of an automobile.

2. Description of the Prior Art

Entertainment systems for automobiles are well known. As such, many advances have been made in the development of entertainment systems that make the otherwise tedious task of riding in an automobile mote bearable. In addition to the development of overhead systems pioneered by the present inventor, a variety of systems and techniques for integrating entertainment systems within an automobile have been developed.

For example, headrest entertainment systems have been developed and allow multiple individuals to view a variety of different video sources within the same vehicle. However, some automobiles are not suited for the utilization of headrest entertainment systems and, therefore, are unable to take advantage of this advancement in technology. Similarly, only larger vehicles can take advantage of the overhead systems commonly found in automobiles.

With this in mind, alternate techniques for implementing entertainment systems within automobiles are needed. The present invention attempts to add to the choices consumers have by providing an automobile entertainment system that may be integrated within the central armrest/console of an automobile.

SUMMARY OF THE INVENTION

It is, therefore, an object of the present invention to provide a vehicle entertainment system including a video system mounted within an automobile armrest/console, the armrest/console including an upper support surface. The video system includes an integrated housing supporting a video monitor, wherein the video monitor is mounted upon the housing for rotation relative thereto.

It is also a further object of the present invention to provide an entertainment system wherein the video system includes a video source which is a DVD player or hard drive.

It is also an object of the present invention to provide an entertainment system wherein the upper support surface is an armrest module.

It is another object of the present invention to provide an entertainment system wherein the armrest module is selectively removable from the armrest/console.

It is a further object of the present invention to provide an entertainment system wherein the housing includes a first surface upon which the video monitor is mounted, and the video monitor selectively rotates about an axis substantially perpendicular to the surface.

It is also another object of the present invention to provide an entertainment system wherein RCA ports are located on the first surface of the housing.

It is a further object of the present invention to provide an entertainment system wherein the video monitor swivels between a use first position and a storage second position, and the RCA ports are only visible when the video monitor is in its use first position.

It is another object of the present invention to provide an entertainment system wherein the video monitor swivels between a use first position and a storage second position, and the control buttons are only visible when the video monitor is in its use first position.

It is yet a further object of the present invention to provide an entertainment system wherein a swivel couples the video monitor to the housing.

It is still another object of the present invention to provide an entertainment system wherein the housing includes a storage compartment and a video source is housed within the storage compartment.

It is also an object of the present invention to provide an armrest/console incorporating a vehicle entertainment system. The armrest/console includes an upper support surface with a video system mounted therein. The video system includes an integrated housing supporting a video monitor, wherein the video monitor is mounted upon the housing for rotation relative thereto.

Other objects, advantages and salient features of the invention will become apparent from the following detailed description, which taken in conjunction with the annexed drawings, discloses a preferred, but non-limiting, embodiment of the subject invention.

BRIEF DESCRIPTION OF THE DRAWING

FIGS. 6, 7 and 8 disclose an alternate embodiment of the present invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

Figure 1:
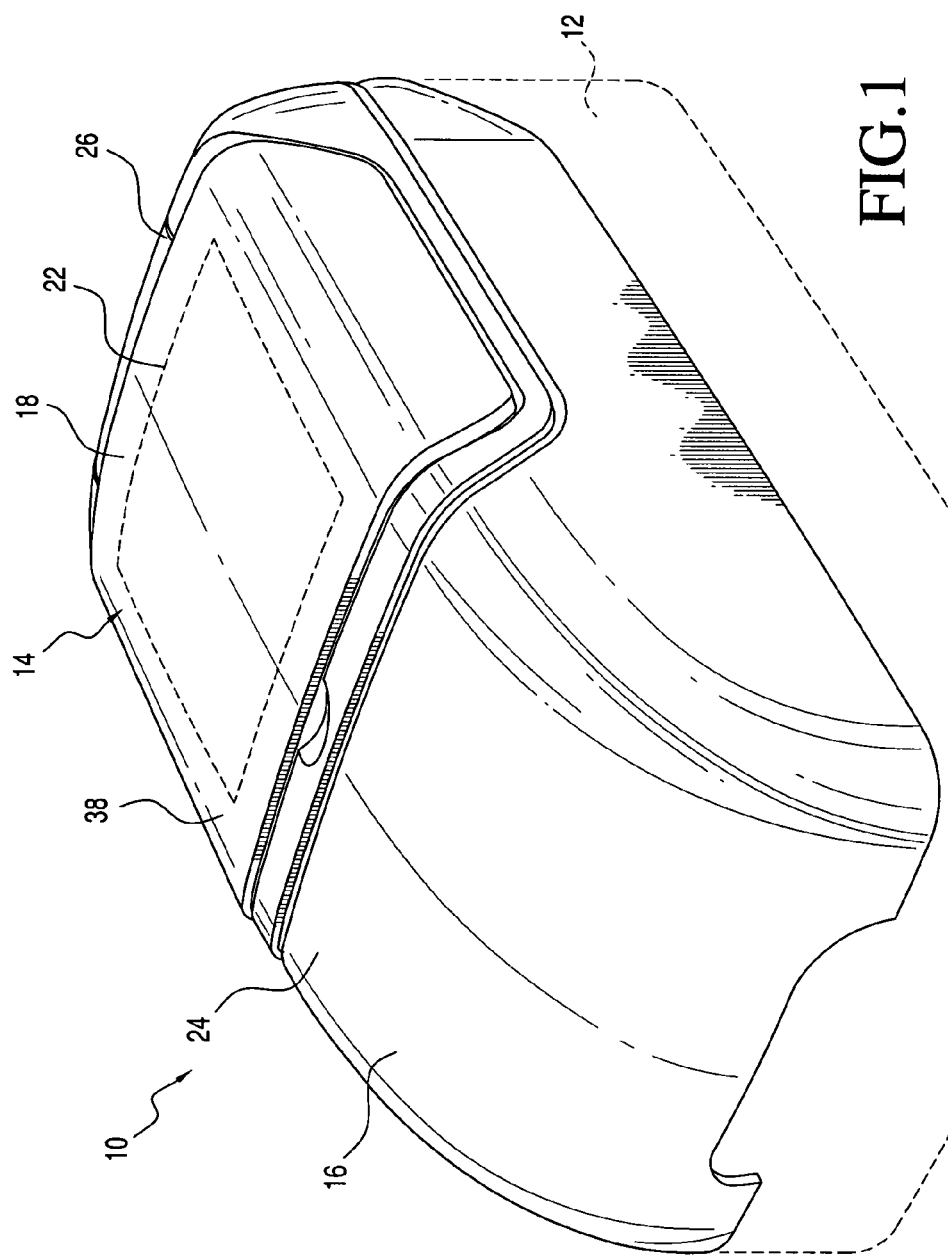
FIG. 1 is a front perspective view of the present central armrest/console automobile entertainment system with the video monitor in its closed position.
Figure 2:
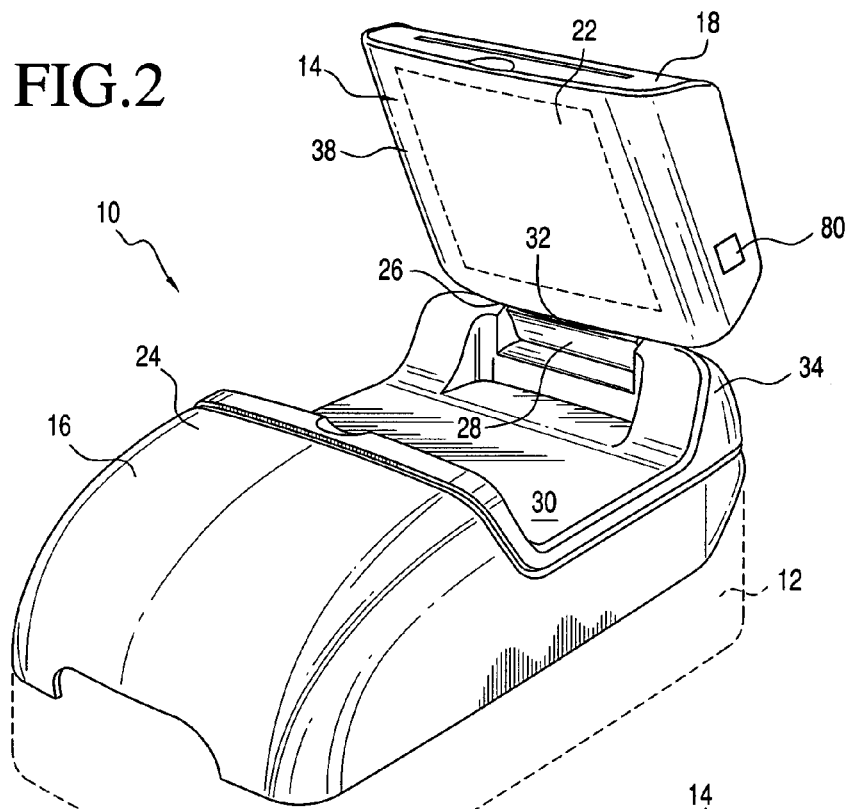
FIG. 2 is a front perspective view of the present automobile entertainment system with the video monitor in its viewing position.
Figure 3:
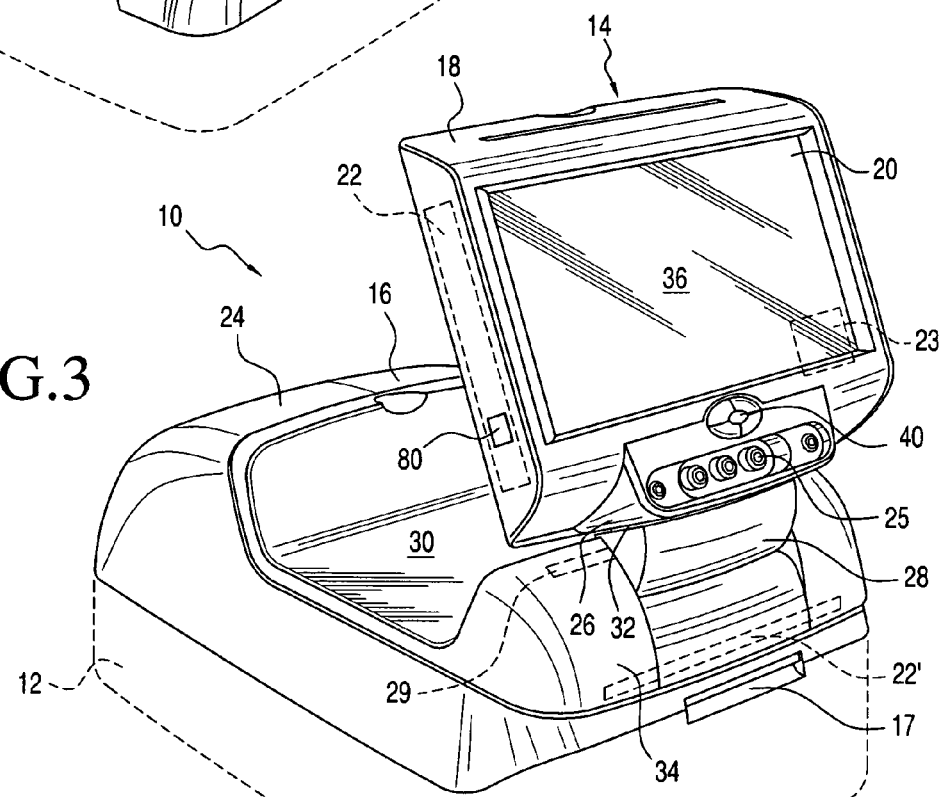
FIG. 3 is a rear perspective view of the present automobile entertainment system with the video monitor in its viewing position.

With reference to FIGS. 1 to 3, and in accordance with a first embodiment of the present invention, an automobile entertainment system 10 is disclosed. The automobile entertainment system 10 is composed of a series of video and audio components integrated within a central armrest/console 12 of a traditional automobile. In particular, the entertainment system 10 includes a video system 14 mounted within an armrest module 16 adapted for connection with the armrest/console 12 of a traditional automobile. Although the present invention is described herein with reference to an automobile, those skilled in the art will readily appreciate the system may be employed in a variety of vehicles, for example, boats or planes, without departing from the spirit of the present invention. The video system 14 generally includes a housing 18 in which a video monitor 20 and video source 22 are supported. The housing 18, with the video monitor 20 and video source 22, is integrated with the armrest module 16 which functions as both a support for the video monitor 20/video source 22 and the upper support surface 24 of the armrest/console 12. Although the present invention is adapted for use in conjunction with the center armrest/console of a vehicle, the concepts underlying the present invention could readily be applied to other support, storage and/or console type structures (for example, within a door of a vehicle) found within an automobile.

The armrest module 16 is modular in design and is adapted for use within a variety of automobiles by simply changing the appearance and shape of the armrest module 16 so it matches the armrest/console 12. In particular, many automobiles today include an armrest/console with a storage compartment (not shown) formed therein. The storage compartment is commonly accessed via a hinged upper support surface 24 that is pivoted toward the rear seat of the automobile to expose the contents of the storage cavity formed within the armrest/console 12. It is this upper support surface 24 which is replaced by the present entertainment system for conveniently installing an entertainment system within an automobile.

By employing the present entertainment system 10, a video system 14 may be installed within a variety of vehicles regardless of the ceiling height or headrest dimensions by simply replacing the upper support surface of the factory installed armrest/console with the present armrest module 16. As those skilled in the art will certainly appreciate, the present armrest module 16 is provided with a hinge structure 17 adapted for ready attachment to the existing structure of the automobile. Further, and as those skilled in the art will also certainly appreciate, the hinge structure may be varied to suit the automobile for which the armrest module is designed.

In accordance with a preferred embodiment of the present invention, the video source 22 is a DVD player coupled to the video monitor 20 for the transmission of video content thereto. That is, the DVD player 22 or other video source is integrated within the same housing 18 as the video monitor 20. It is also contemplated that a hard drive 23 video source may also be integrated with the video monitor 16. As those skilled in the art will certainly appreciate the hard drive 23 will include an input(s) for receiving video content and an output(s) for transmitting video content to the video monitor 16, both of which are well known to those skilled in the art. The video system 14 is further provided with RCA ports 25 for connection of other video sources. However, and as discussed below in greater detail, the video source may take a variety of forms without departing from the spirit of the present invention; for example, and not limited to, satellite video systems and Bluetooth wireless based systems. In addition, and as discussed below, the video source may be housed at a location separate from the video monitor without departing from the spirit of the present invention.

The video system 14 is pivotally mounted to the armrest module 16 in a manner permitting storage and retrieval thereof. More particularly, the base 26 of the video system 14 is pivotally mounted to the armrest module 16 in a manner that permits rotation of the video system 14 about multiple axes. A first hinge 28 facilitates rotation of the video monitor 20 from its storage position within a recess 30 formed in the armrest module 16 to an upstanding position for viewing thereof. The second hinge 32 permits rotation of the video monitor 20 about an axis substantially perpendicular to the axis of the first hinge 28. As such, the second hinge 32 allows for rotation of the video monitor 20 in a manner that facilitates both viewing and protection of the video monitor 20. The first hinge 28 is further provided with a lock-out pin 29 shaped and dimensioned for preventing rotation of the video monitor to a storage position when it is rotated rearwardly (see FIG. 3) for viewing by those in the back seat of the vehicle. Although a specific hinge structure is disclosed in accordance with a preferred embodiment, various hinge structures could be employed without departing from the spirit of the present invention.

In particular, the base 26 of the video monitor 20 is pivotally secured to the armrest module 16 at a position adjacent to the rear 34 of the armrest module 16. When the video monitor 20 is in its storage position within the recess 30 of the armrest module 16, it is oriented with the video screen 36 facing downward and the back 38 of the video monitor 20 facing upward. As such, the back 38 of the video monitor 20 functions as part of the armrest/console 12 when the video monitor 20 is in its storage position.

When one wishes to watch a presentation on the video system 14 from the back seat of the automobile, the video monitor 20 is lifted from the recess 30 within the armrest module 16, rotated upward about the first hinge 28 and then rotated approximately 180 degrees about the second hinge 32 such that the video screen 36 faces the back seat of the automobile.

The video monitor 20, DVD player 22 and associated control components are mounted within the housing 18 of the video system 14. In accordance with a preferred embodiment, the video monitor 20 is a TFT LCD screen. However, it is contemplated that other monitor constructions, for example, plasma, Ultra High Definition VGA, touch screen VGA, organic LED, fabric based monitors (e.g., flexible TFT), etc., may be used without departing from the spirit of the present invention.

With regard to the DVD player 22, it is structured as a top slot loading DVD player known to those skilled in the art. It is integrally molded within the housing 18 and positioned for insertion of DVDs behind the video monitor 20. By mounting the DVD player 22 in this way, a stable structure is developed that is well adapted for the automobile environment. It is contemplated the DVD player may also be a side-loaded design with the slot located either on the left or right side of the housing.

Figure 4:
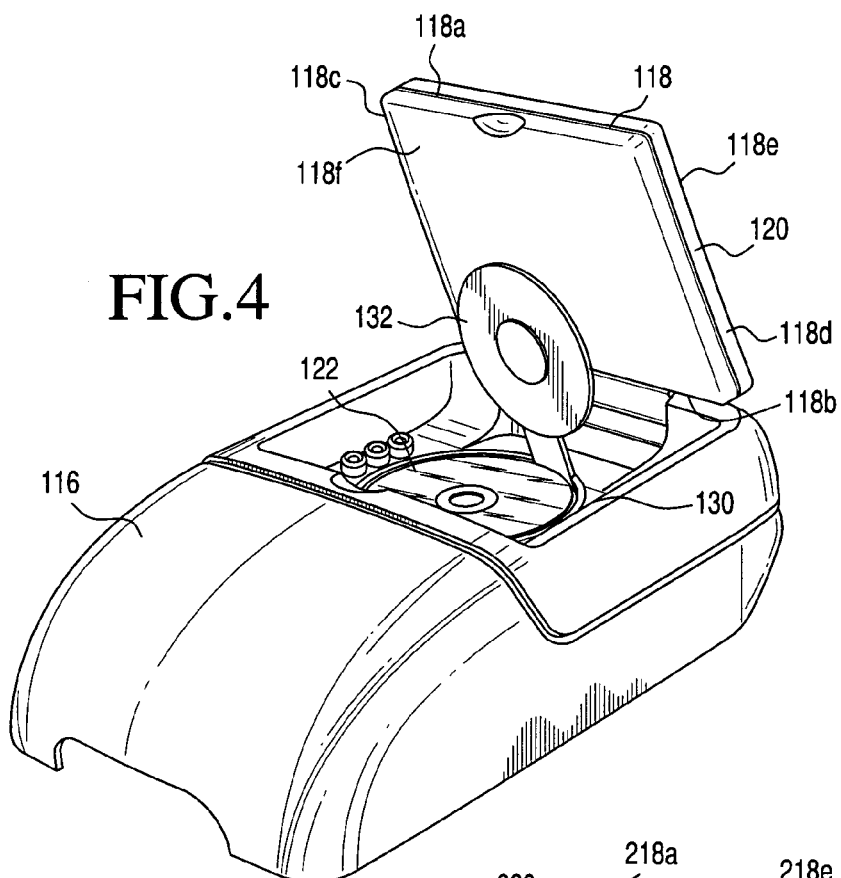
FIGS. 4 and 5 ate rear perspective views of alternate embodiments of the present automobile entertainment system showing various DVD player configurations contemplated in accordance with the present invention.
Figure 5:
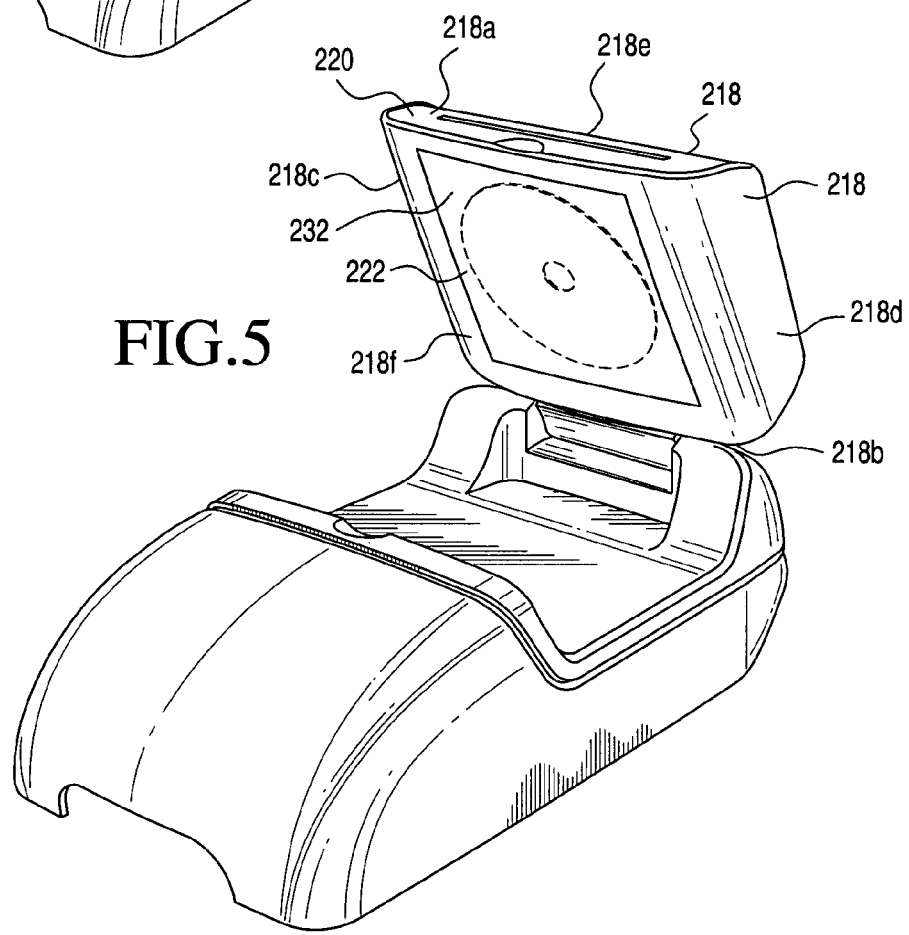

While the DVD player is disclosed as being a slot-loaded design with insertion behind the video monitor in accordance with a preferred embodiment of the present invention, the DVD player could take a variety of other forms while still being integrated with the video monitor and/or the armrest module. For example, and with reference to the broken lines labeled 22' shown in FIG. 3, the DVD player 22' may be formed within the armrest module 16 for access by those in the back seat of the vehicle. In addition, and with reference to FIG. 4, the DVD player 122 may be positioned beneath the pivotally mounted video monitor 120 and video monitor housing 118, and within the recess 130 of the armrest module 116 allowing for insertion of DVDs beneath the video monitor 120 when the video monitor 120 is in an open position. As the video monitor housing includes a top 118a, bottom 118b, first and second sides 118c, 118d, front surface 118e and rear surface 118f, the DVD player 122 is mounted within the recess 130 of the armrest module 116 such that the DVD player 122 may be accessed for loading and unloading of DVDs when the video monitor housing 118 is pivoted forward. This embodiment includes a pivotally supported cover 132 providing selective access for the retrieval and insertion of new DVDs. With reference to FIG. 5, the DVD player 222 may be integrated with the backside, or rear surface, 218e of the video monitor housing 218 that includes a top 218a, bottom 218b, first and second sides 218c, 218d, front surface 218e and rear surface 218f. DVDs are snapped into the DVD player 222, allowing for insertion of DVDs behind the video monitor 220 when the video monitor housing 218 is in an open position. As with the DVD player disclosed with reference to FIG. 4, the DVD player 222 is provided with a pivotally supported cover 232 allowing for selective access for the retrieval and insertion of new DVDs. The slot-loaded design may also be varied to allow for slot loading on either the right or left side of the video system. In addition, the DVD player may be designed with a built-in TV tuner for providing the user with a choice of video sources.

Control of the video system 14, including the video monitor 20, DVD player 22, hard drive 23 and other components of the video system 14, is facilitated by the provision of control buttons 40 along the outer surface of the video system 14. In accordance with a preferred embodiment of the present invention, the control buttons 40 take the form of a multifunction controller permitting movement of a cursor shown upon various interfaces displayed upon the video monitor. In addition, conventional control buttons may also be provided for control of traditional functions. In addition to the provision of manual control buttons, the video system may further include a remote control (not shown) such that an individual need not actually touch the video system to control the video content or the volume generated by the video system. Once again, and as those skilled in the art will certainly appreciate, a variety of remote control systems may be utilized without departing from the spirit of the present invention. The system 14 may also be provided with inputs 44 for audio/visual content coming from remote sources, for example, gaming units, video players, etc.

Specific wiring arrangements and linking of various video systems within an automobile in accordance with preferred embodiments of the present invention are disclosed in U.S. patent application Ser. No. 10/920,425, entitled "AUTOMOBILE ENTERTAINMENT SYSTEM", filed Aug. 18, 2004, which is incorporated herein by reference, U.S. patent application Ser. No. 10/895,111, entitled "AUTOMOBILE ENTERTAINMENT SYSTEM", filed Jul. 21, 2004, which is incorporated herein by reference, U.S. patent application Ser. No. 10/895,110, entitled "AUTOMOBILE ENTERTAINMENT SYSTEM LINKING MULTIPLE VIDEO SYSTEM FOR COORDINATED SHARING OF VIDEO CONTENT", filed Jul. 21, 2004, which is incorporated herein by reference, U.S. patent application Ser. No. 10/895,086, entitled "HOUSING FOR AN AUTOMOBILE ENTERTAINMENT SYSTEM", filed Jul. 21, 2004, which is incorporated herein by reference, U.S. patent application Ser. No. 10/895,099, entitled "INSTALLATION APPARATUS FOR AN AUTOMOBILE ENTERTAINMENT SYSTEM", filed Jul. 21, 2004, which is incorporated herein by reference, U.S. patent application Ser. No. 10/920,431, entitled "AUTOMOBILE ENTERTAINMENT SYSTEM", filed Aug. 18, 2004, which is incorporated herein by reference, and U.S. patent application Ser. No. 10/920,430, entitled "AUTOMOBILE ENTERTAINMENT SYSTEM", filed Aug. 18, 2004, which is incorporated herein by reference.

In addition to contemplated hardwiring of the present video system within an automobile, the system may be designed for quick installation by a vehicle owner. With this in mind, and as those skilled in the art will certainly appreciate, the present video system may be designed for simply plugging it into a power source (for example, a cigarette lighter) commonly found in vehicles. In accordance with such an embodiment, the video system would be provided with a pass through for access to wires linking the video system to a power source and/or external speakers.

The present video system 14 is provided with the ability to offer a variety of functionalities. These functionalities may be hardwired or programmed within the video system 14 or the functionalities may be added in a modular manner via an expansion slot 80 provided within the video system 14. Contemplated functionalities include, but are not limited to, satellite radio (for example, Serius, XM), Pictel phone satellite television (for example, DirecTV), GPS guidance systems, quick release battery packs, memory cards, wireless internet access (for example, Wi-Fi), Bluetooth, digital video recorders, digital video reception and recording, digital video inputs, video conferencing, cellular digital, cellular digital with a camera, USB capabilities, Blue sphere, hot swap hard drive, satellite video import card, wireless video import card, etc. Additional details regarding the implementation of such features are found in commonly owned U.S. patent application Ser. No. 11/153,364, entitled "VEHICLE ENTERTAINMENT SYSTEM INCLUDING A DETACHABLE FUNCTIONAL MODULE HOUSED WITHIN A DETACHABLE VIDEO SYSTEM", filed Jun. 16, 2005, which is incorporated herein by reference.

In addition, and in accordance with a preferred embodiment, a broadcast television receiver 46 is integrated with the video monitor 20 and/or the armrest module 16. More particularly, and with reference to FIG. 2, the housing 18 is provided with a rear recess 48 shaped and dimensioned for receiving a television receiver 46. The television receiver 46 may, therefore, be wired for use in conjunction with the video monitor in a manner known to those skilled in the art.

The television receiver 46 is further provided with an antenna 50. The antenna 50 is electrically connected to the television receiver 46 for the transmission of over-the-air signals. As those skilled in the art will certainly appreciate, the antenna may take a variety of forms without departing from the spirit of the present invention. In addition, and as those skilled in the art will certainly appreciate, the antenna may be wired or wirelessly connected to the television receiver, and take a variety of forms, without departing from the spirit of the present invention.

Although the present invention is disclosed herein as including a single monitor, it is contemplated the system could be designed with dual monitors for viewing from opposite sides of the vehicle. Such a system could include distinct DVD players associated with each monitor or a single DVD player linked to both monitors.

In accordance with yet a further embodiment of the present invention, the video monitor is mounted to permit swivel thereof for optimizing the viewing area provided to a vehicle occupant. In particular, recent developments have made viewing of videos in a "letterbox format" very popular. However, this necessitates that the video monitor also be letterbox shaped to optimize the usable viewing area along the video monitor. Since the space between front seats in an automobile is oftentimes limited, the present swivel mechanism has been developed to allow for the use of an optimal screen size despite small spaces between the automobile seats.

As with the prior embodiments, and with reference to FIGS. 6 to 8, the automobile entertainment system 310 is composed of a series of video and audio components integrated within a central armrest/console 312 of a traditional automobile. In particular, the entertainment system 310 includes a video system 314 mounted within an armrest module 316 adapted for connection with the armrest/console 312 of a traditional automobile. The video system 314 generally includes a housing 318 which supports a video monitor 320 and video source 322. The housing 318, with the video monitor 320 and video source 322, is integrated with the armrest module 316 which functions as both a support for the video monitor 320/video source 322 and the upper support surface 324 of the armrest/console 312.

In accordance with a preferred embodiment of the present invention, the video source 322 is a DVD player coupled to the video monitor 320 for the transmission of video content thereto. That is, the DVD player 322 or other video source is integrated within the same housing 318 as supports the video monitor 320. It is also contemplated that a hard drive 323 video source may also be integrated with the video monitor 316. The video system 314 is further provided with RCA ports 325 for connection of other video sources.

The housing 318 is specifically structured to permit rotation of the video monitor 320 about an axis perpendicular to the plane in which the housing 318 lies. More particularly, the housing 318 is constructed with a storage compartment 352 having a front surface 354 and a rear surface 356. Within the storage compartment 352 is housed the DVD player 322 (for example, a slot loaded DVD player as discussed above, although, and as described above, a variety of DVD player constructions may be employed without departing from the spirit of the present invention), hard drive 323 and other electronic components requited for operation of the present video system 314. As discussed above, the rear surface 356 of the housing 318 is a flat surface, preferably, padded, which functions as part of the upper support surface 324 when the video system 314 is in its storage position.

The video monitor 320 is mounted along the front surface 354 of the housing 318. The video monitor 320 is mounted on a swivel 358 which permits the video monitor 320 to rotate about an axis substantially perpendicular to the plane in which the housing 318 lies. With the ability to swivel the video monitor 320, the size of the video monitor 320 may be optimized based upon the desired use in a letterbox configuration (see FIG. 8) and the spacing between the automobile seats between which the video system 314 sits. More particularly, the video monitor 320 may be selectively swiveled between a use first position (see FIG. 8) and a storage second position (see FIG. 7).

Enhance used is further provided by placing control buttons 344 of the video system 314 and RCA ports 325 along the front surface 354 of the housing 318 such that they are only exposed when the video monitor 320 is rotated to its letterbox configuration, that is, use first position. With this in mind, the control buttons 344 and RCA ports 325 are positioned along the upper and lower extents 360, 362 of the front surface 354 of the housing 318.

The video system 314 is pivotally mounted to the armrest module 316 in a manner permitting storage and retrieval thereof. More particularly, the base 326 of the video system 314 is pivotally mounted to the armrest module 316 in a manner that permits rotation of the video system 314 about multiple axes. A first hinge 328 facilitates rotation of the video monitor 320 from its storage position within a recess 330 formed in the armrest module 316 to an upstanding position for viewing thereof. The second hinge 332 permits rotation of the video monitor 320 about an axis substantially perpendicular to the axis of the first hinge 328. As such, the second hinge 332 allows for rotation of the video monitor 320 in a manner that facilitates both viewing and protection of the video monitor 320. As with the prior embodiment, a lockout pin may also be provided.

In particular, the base 326 of the video monitor 320 is pivotally secured to the armrest module 316 at a position adjacent to the rear 334 of the armrest module 16. When the video monitor 320 is in its storage position within the recess 330 of the armrest module 316, it is oriented with the video screen 336 facing downward and the back 338 of the video monitor 320 facing upward. As such, the back 338 of the video monitor 320 functions as part of the armrest/console 312 when the video monitor 320 is in its storage position.

When one wishes to watch a presentation on the video system 314 from the back seat of the automobile, the video monitor 320 is lifted from the recess 330 within the armrest module 316, rotated upward about the first hinge 328 and then rotated approximately 180 degrees about the second hinge 332 such that the video screen 336 faces the back seat of the automobile. The video monitor 320 is thereafter rotated to its first use position. It is further contemplated the video monitor may be designed to allow for vertical adjustment, for example, from approximately 4 inches to approximately 10 inches, to allow for improved user viewing. It is contemplated this will be accomplished through the use of a sprocket mechanism integrated with the video system.

Control of the video system 314, including the video monitor 320, DVD player 322, hard drive 323 and other components of the video system 314, is facilitated by the provision of control buttons 344 along the outer surface of the video system 314. In accordance with a preferred embodiment of the present invention, the control buttons 344 take the form of a multifunction controller permitting movement of a cursor shown upon various interfaces displayed upon the video monitor.

In addition, and as discussed above in accordance with the prior embodiments, a broadcast television receiver (not shown) is integrated with the video monitor 320 and/or the armrest module 316. The housing 318 is provided with a rear recess shaped and dimensioned for receiving a television receiver. The television receiver may, therefore, be wired for use in conjunction with the video monitor in a manner known to those skilled in the art. The television receiver 346 is further provided with an antenna.

In addition to the preferred embodiment disclosed above, it is contemplated the video system may be designed for quick release and at various remote locations. Such a variation would be contemplated by using techniques similar to those disclosed in U.S. patent application Ser. No. 11/172,937, filed Jul. 5, 2005, entitled DETACHABLE VEHICLE ENTERTAINMENT SYSTEM FOR THE ARMREST/COSOLE OF A VEHICLE, which is incorporated herein by reference.

While the preferred embodiments have been shown and described, it will be understood that there is no intent to limit the invention by such disclosure, but rather, is intended to cover all modifications and alternate constructions failing within the spirit and scope of the invention as defined in the appended claims.

The invention claimed is:

1. A vehicle entertainment system, comprising:
 a video system mounted within an automobile armrest/console, the armrest/console including an upper support surface;
 the video system including an housing supporting a video monitor, the housing including a base pivotaily mounted to the automobile armrest/console for pivotal movement about multiple axes, wherein a first hinge provides for rotation about a first axis and a second hinge provides for rotation about a second axis substantially perpendicular to the first axis;
 wherein the video monitor is mounted upon a front surface of the housing for rotation of the video monitor about an axis perpendicular to the plane in which a front surface of the video monitor lies such that the video monitor may be selectively rotated relative to the housing between a letterbox use first position and a storage second position, the housing also including a rear surface opposite the front surface which functions as part of the upper support surface when the video system is in its storage position.

2. The entertainment system according to claim 1, wherein the video system includes a video source which is a DVD player or hard drive.

3. The entertainment system according to claim 1, wherein the upper support surface is an armrest module.

4. The entertainment system according to claim 3, wherein the armrest module is selectively removable from the armrest/console.

5. The entertainment system according to claim 1, wherein RCA ports are located on the first surface of the housing.

6. The entertainment system according to claim 5, wherein the RCA ports are only visible when the video monitor is in its use first position.

7. The entertainment system according to claim 1, wherein control buttons are located on the first surface of the housing.

8. The entertainment system according to claim 7, wherein the control buttons are only visible when the video monitor is in its use first position.

9. The entertainment system according to claim 1, wherein a swivel couples the video monitor to the housing.

10. The entertainment system according to claim 1, wherein the housing includes a storage compartment and a video source is housed within the storage compartment.

11. An armrest/console incorporating a vehicle entertainment system, comprising:
 an upper support surface with a video system mounted therein;
 the video system including an housing supporting a video monitor, the housing including a base pivotally mounted to the automobile armrest/console for pivotal movement about multiple axes, wherein a first binge provides for rotation about a first axis and a second hinge provides for rotation about a second axis substantially perpendicular to the first axis;
 wherein the video monitor is mounted upon a front surface of the housing for rotation of the video monitor about an axis perpendicular to the plane in which a front surface of the video monitor lies such that the video monitor may be selectively rotated relative to the housing between a letterbox use first position and a storage second position, the housing also including a rear surface opposite the front surface which functions as part of the upper support surface when the video system is in its storage position.

12. The armrest/console according to claim 11, wherein the video system includes a video source which is a DVD player or hard drive.

13. The armrest/console according to claim 12, wherein the upper support surface is an armrest module.

14. The armrest/console according to claim 13, wherein the armrest module is selectively removable from the armrest/console.

15. The armrest/console according to claim 11, wherein RCA ports are located on the first surface of the housing.

16. The armrest/console according to claim 15, wherein the RCA ports are only visible when the video monitor is in its use first position.

17. The armrest/console according to claim 11, wherein control buttons are located on the first surface of the housing.

18. The armrest/console according to claim 17, wherein the control buttons are only visible when the video monitor is in its use first position.

19. The armrest/console according to claim 11, wherein a swivel couples the video monitor to the housing.

20. The armrest/console according to claim 11, wherein the housing includes a storage compartment and a video source is housed within the storage compartment.

* * * * *